United States Patent
Ozeki (10) Patent No.: US 11,556,142 B2
(45) Date of Patent: Jan. 17, 2023

(54) WARM-UP EVALUATION DEVICE, WARM-UP EVALUATION METHOD, AND WARM-UP EVALUATION PROGRAM

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 366 days.

(21) Appl. No.: 16/668,830

(22) Filed: Oct. 30, 2019

(65) Prior Publication Data
US 2020/0159262 A1    May 21, 2020

(30) Foreign Application Priority Data

Nov. 19, 2018   (JP) .............................. JP2018-216530

(51) Int. Cl.
*G05B 23/00*    (2006.01)
*G05D 23/19*    (2006.01)
*G05B 13/02*    (2006.01)

(52) U.S. Cl.
CPC ..... *G05D 23/1917* (2013.01); *G05B 13/0265* (2013.01)

(58) Field of Classification Search
CPC .............. B23Q 11/0003; B23Q 11/127; G05B 13/0265; G05D 23/1917
See application file for complete search history.

(56) References Cited

U.S. PATENT DOCUMENTS 4,711,450 A * 12/1987 McArthur .............. A63B 24/00
                                                      482/5
10,509,389 B2 * 12/2019 Endou .................. G05B 19/404
(Continued)

FOREIGN PATENT DOCUMENTS

DE    102015107791 A1 * 11/2015 .......... G05B 19/401
JP        5890467 B2      3/2016
JP      2017224045 A     12/2017

OTHER PUBLICATIONS

Machine translation for EP-2928305-A2, Stork Genannt Wersborg Ingo (Year: 2015).*

(Continued)

*Primary Examiner* — Michael D Masinick
(74) *Attorney, Agent, or Firm* — Studebaker & Brackett PC (57) ABSTRACT

A warm-up evaluation device includes: a temperature data acquisition unit that acquires temperature data before warm-up operation when a machine performs the warm-up operation; a parameter value acquisition unit that acquires parameter values set in a program for performing the warm-up operation; an evaluation data acquisition unit that acquires evaluation data for evaluating a result of the warm-up operation; a learning unit that learns a machine learning model which receives the temperature data and the parameter values as an input and outputs the evaluation data on the basis of a plurality of warm-up operations performed by the same or the same types of machines; and an evaluation unit that inputs candidates for the parameter values to the machine learning model together with the temperature data and outputs the evaluation data when the same or the same types of machines perform a new warm-up operation.

8 Claims, 6 Drawing Sheets

| | WARMED UP | TIME TAKEN (min) | POWER CONSUMPTION (W) | POWER CONSUMPTION AMOUNT (MWs) | DETERMINATION | EVALUATION VALUE |
|---|---|---|---|---|---|---|
| | ... | ... | ... | ... | ... | ... |
| | × | 40 | 1200 | 2.88 | INAPPROPRIATE | |
| | ○ | 34 | 1300 | 2.65 | APPROPRIATE | 36 |
| C | ○ | 25 | 1800 | 2.7 | APPROPRIATE | 40 |
| | ○ | 20 | 2400 | 2.88 | APPROPRIATE | 27 |
| | × | 15 | 3500 | 3.15 | INAPPROPRIATE | |
| | ... | ... | ... | ... | ... | ... |

(56) References Cited

U.S. PATENT DOCUMENTS

| | | | | |
|---|---|---|---|---|
| 2008/0003033 | A1* | 1/2008 | Aizawa | G06F 3/1285 |
| | | | | 400/62 |
| 2012/0076523 | A1* | 3/2012 | Kojima | G03G 15/5004 |
| | | | | 399/70 |
| 2013/0302180 | A1* | 11/2013 | Fujii | B23Q 11/0003 |
| | | | | 417/1 |
| 2013/0333486 | A1* | 12/2013 | Watanabe | G01L 1/00 |
| | | | | 73/862.381 |
| 2015/0338841 | A1* | 11/2015 | Fujimoto | G05B 19/401 |
| | | | | 700/195 |
| 2016/0358099 | A1* | 12/2016 | Sturlaugson | G06N 5/043 |
| 2018/0082215 | A1* | 3/2018 | Mizobuchi | G06N 20/00 |
| 2018/0275629 | A1* | 9/2018 | Watanabe | G01K 3/00 |

OTHER PUBLICATIONS

Kapitanova, Krasimira, and S. Son. "Machine learning basics." Intelligent Sensor Networks (2012): 3-29. (Year: 2012).*

Jordan, Jeremy. "Hyperparametertuning formachine learning models.", Nov. 2, 2017, https://www.jeremyjordan.me/hyperparameter-tuning/ (Year: 2017).*

* cited by examiner

| WARMED UP | TIME TAKEN (min) | POWER CONSUMPTION (W) | POWER CONSUMPTION AMOUNT (MWs) | DETERMINATION |
|---|---|---|---|---|
| ... | ... | ... | ... | ... |
| × | 40 | 1200 | 2.88 | INAPPROPRIATE |
| ○ | 34 | 1300 | 2.65 | APPROPRIATE |
| ○ | 25 | 1800 | 2.7 | APPROPRIATE |
| ○ | 20 | 2400 | 2.88 | APPROPRIATE |
| × | 15 | 3500 | 3.15 | INAPPROPRIATE |
| ... | ... | ... | ... | ... |

FIG. 5

| WARMED UP | TIME TAKEN (min) | POWER CONSUMPTION (W) | POWER CONSUMPTION AMOUNT (MWs) | DETERMINATION | EVALUATION VALUE |
|---|---|---|---|---|---|
| ... | ... | ... | ... | ... | ... |
| × | 40 | 1200 | 2.88 | INAPPROPRIATE | |
| ○ | 34 | 1300 | 2.65 | APPROPRIATE | 36 |
| ○ | 25 | 1800 | 2.7 | APPROPRIATE | 40 |
| ○ | 20 | 2400 | 2.88 | APPROPRIATE | 27 |
| × | 15 | 3500 | 3.15 | INAPPROPRIATE | |
| ... | ... | ... | ... | ... | ... |

WARM-UP EVALUATION DEVICE, WARM-UP EVALUATION METHOD, AND WARM-UP EVALUATION PROGRAM

This application is based on and claims the benefit of priority from Japanese Patent Application No. 2018-216530, filed on 19 Nov. 2018, the content of which is incorporated herein by reference.

BACKGROUND OF THE INVENTION

Field of the Invention

The present invention relates to a device, a method, and a program for performing a warm-up operation of a machine appropriately.

Related Art

Conventionally, an operation of warming up a machine before actual machining is generally performed so that a thermal displacement of a spindle, motion accuracy of driving unit, a temperature of a coolant, and the like are maintained to be constant in order to stabilize machine accuracy of a machine tool. This warm-up operation is preferably performed efficiently in a short period since this operation is a preparatory operation before actual machining is executed. For example, Patent Document 1 proposes a method of preparing a plurality of warm-up programs in advance so as to correspond to an ambient temperature and humidity of a machine tool and operating the machine tool according to the corresponding warm-up program. Moreover, Patent Document 2 proposes a method of calculating an appropriate warm-up operation period on the basis of a temperature time constant.

Patent Document 1: Japanese Patent No. 5890467
Patent Document 2: Japanese Unexamined Patent Application, Publication No. 2017-224045

SUMMARY OF THE INVENTION

However, in the conventional methods, it is necessary to create a number of warm-up programs corresponding to various conditions in advance. Moreover, in the conventional methods, it is difficult to perform an appropriate warm-up operation depending on a situation since the methods employ fixed evaluation criteria based on efficiency only.

An object of the present invention is to provide a warm-up evaluation device, a warm-up evaluation method, and a warm-up evaluation program capable of determining an appropriate warm-up program.

(1) A warm-up evaluation device (for example, a numerical controller 1 to be described later) according to the present invention includes: a temperature data acquisition unit (for example, a temperature data acquisition unit 11 to be described later) that acquires temperature data before warm-up operation when a machine performs the warm-up operation; a parameter value acquisition unit (for example, a parameter value acquisition unit 12 to be described later) that acquires parameter values set in a program for performing the warm-up operation; an evaluation data acquisition unit (for example, an evaluation data acquisition unit 13 to be described later) that acquires one or a plurality of pieces of evaluation data for evaluating a result of the warm-up operation; a learning unit (for example, a learning unit 14 to be described later) that learns a machine learning model (for example, a machine learning model 20 to be described later) which receives the temperature data and the parameter values as an input and outputs the evaluation data on the basis of a plurality of warm-up operations performed by the same or the same types of machines; and an evaluation unit (for example, an evaluation unit 15 to be described later) that inputs candidates for the parameter values to the machine learning model together with the temperature data and outputs the evaluation data when the same or the same types of machines perform a new warm-up operation.

(2) In the warm-up evaluation device according to (1), the evaluation data may include at least one of the time or the power consumed for the warm-up operation.

(3) In the warm-up evaluation device according to (1) or (2), the parameter may include at least one of a spindle speed, a feed rate, and the number of repetitions of the program.

(4) In the warm-up evaluation device according to any one of (1) to (3), the temperature data may include at least one of a temperature of a spindle motor or a temperature of a feed axis motor.

(5) In the warm-up evaluation device according to any one of (1) to (4), the evaluation unit may present a parameter value of which a specific item of any one of pieces of evaluation data has the highest evaluation value among parameter values of which the pieces of evaluation data output when a plurality of patterns of predetermined parameter values are input satisfy a predetermined condition.

(6) In the warm-up evaluation device according to (1) to (4), the evaluation unit may present a parameter value of which a comprehensive evaluation weighted for each item of the evaluation data is the highest among parameter values of which the pieces of evaluation data output when a plurality of patterns of predetermined parameter values are input satisfy a predetermined condition.

(7) A warm-up evaluation method according to the present invention causes a computer (for example, a numerical controller 1 to be described later) to execute: a temperature data acquisition step of acquiring temperature data before warm-up operation when a machine performs the warm-up operation; a parameter value acquisition step of acquiring parameter values set in a program for performing the warm-up operation; an evaluation data acquisition step of acquiring one or a plurality of pieces of evaluation data for evaluating a result of the warm-up operation; a learning step of learning a machine learning model (for example, a machine learning model 20 to be described later) which receives the temperature data and the parameter values as an input and outputs the evaluation data on the basis of a plurality of warm-up operations performed by the same or the same types of machines; and an evaluation step of inputting candidates for the parameter values to the machine learning model together with the temperature data and outputting the evaluation data when the same or the same types of machines perform a new warm-up operation.

(8) A warm-up evaluation program according to the present invention causes a computer (for example, a numerical controller 1 to be described later) to function as the warm-up evaluation device according to any one of (1) to (6).

According to the present invention, it is possible to determine an appropriate warm-up program.

DETAILED DESCRIPTION OF THE INVENTION

Hereinafter, an example of an embodiment of the present invention will be described. In the present embodiment, a numerical controller 1 that controls a machine tool will be described as an example of a warm-up evaluation device applicable to an industrial machine including a machine tool, a robot, and the like.

Figure 1:
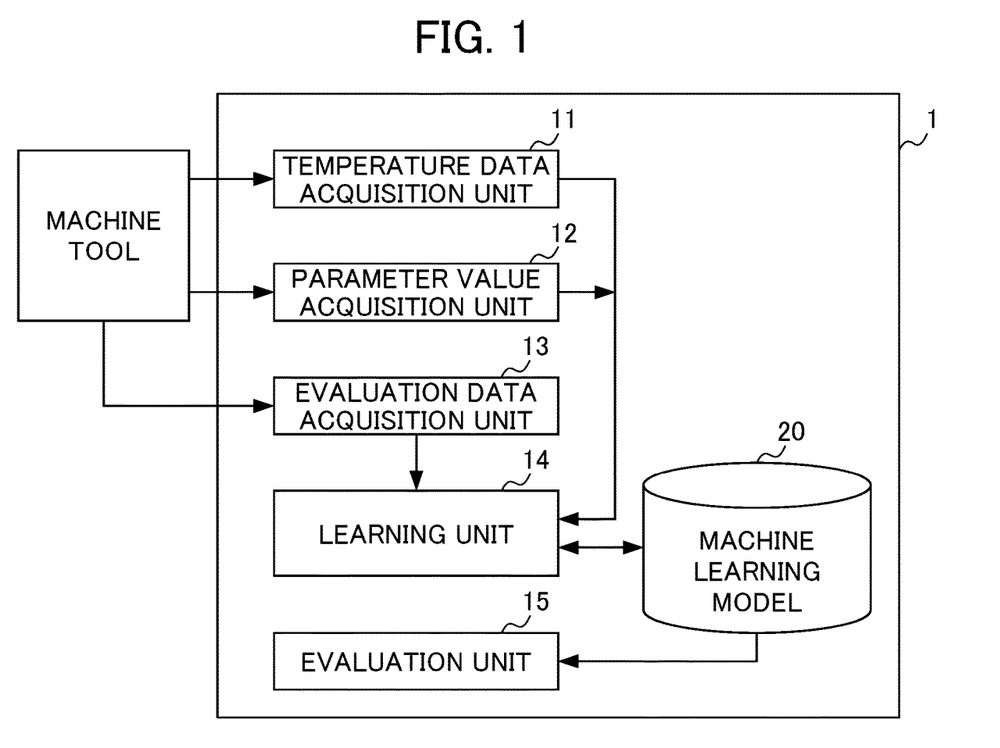
FIG. 1 is a diagram illustrating a functional configuration of a numerical controller according to an embodiment.

FIG. 1 is a diagram illustrating a functional configuration of a numerical controller 1 according to the present embodiment. The numerical controller 1 drives various motors of a machine tool by giving numerical control (NC) data values corresponding to a machining program to an amplifier. Moreover, the numerical controller 1 acquires information such as a position, a velocity, a torque, and a temperature as a feedback from the machine tool.

The numerical controller 1 stabilizes the state of the machine tool by executing a warm-up program before actual machining is executed. The warm-up program can change an operation of the machine tool appropriately by setting predetermined parameters. The numerical controller 1 presents evaluation data of a warm-up operation corresponding to the parameter setting and a combination of optimal parameter values with the aid of the following functional units.

The numerical controller 1 includes a temperature data acquisition unit 11, a parameter value acquisition unit 12, an evaluation data acquisition unit 13, a learning unit 14, and an evaluation unit 15. These functional units are realized when a control unit such as a CPU execute predetermined software (a warm-up evaluation program).

The temperature data acquisition unit 11 acquires temperature data before warm-up operation when the machine tool performs a warm-up operation. The temperature data includes the temperature of each motor of a spindle and a feed axis and the ambient temperature of the machine tool, for example. Furthermore, the temperature data acquisition unit 11 may acquire the ambient humidity of the machine tool.

The parameter value acquisition unit 12 acquires the values of parameters set in the warm-up program when the machine tool performed a warm-up operation. For example, the parameters include a spindle speed, a feed rate, and number of repetitions of the warm-up program.

Figure 2:
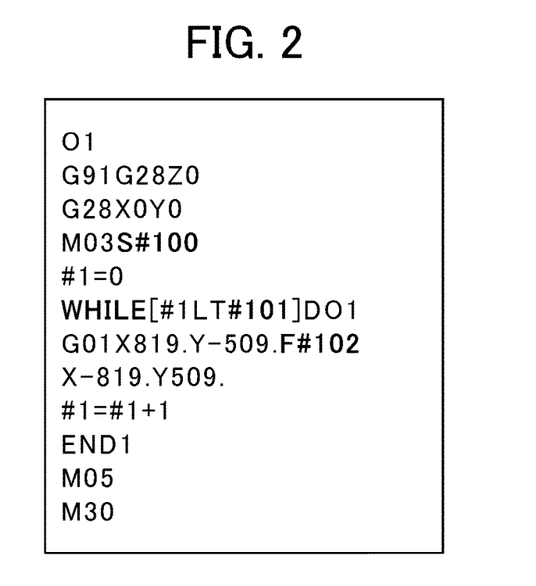
FIG. 2 is a diagram illustrating an example of a warm-up program according to the embodiment.

FIG. 2 is a diagram illustrating an example of a warm-up program according to the present embodiment. In this example, a spindle speed is set in parameter #100, the number of repetitions is set in parameter #101, and a feed rate is set in parameter #102. When such a warm-up program is executed, different warm-up operations corresponding to parameter values are realized.

The evaluation data acquisition unit 13 acquires one or a plurality of pieces of evaluation data that evaluate the result of a warm-up operation executed as a label for machine learning. Examples of the evaluation data include the time and the power consumed for a warm-up operation in addition to the temperature of each motors of a spindle and a feed axis after a warm-up operation was performed.

The evaluation data may include the result of determination of evaluation of actual measurement values performed on the basis of a predetermined determination condition in addition to these actual measurement values. For example, a determination result on whether warm-up can be realized sufficiently, warm-up can be realized in a short period, and warm-up can be realized with a small power consumption mount may be acquired as the label for machine learning.

The learning unit 14 learns a machine learning mode 20 which receives temperature data and parameter values as an input and outputs evaluation data on the basis of a plurality of warm-up operations performed by the same or same types of machine tools and stores the machine learning model 20.

When the same or the same types of machines perform a new warm-up operation, the evaluation unit 15 inputs candidates for parameter values to the machine learning model 20 together with the temperature data before warm-up operation and outputs evaluation data that estimates the result of the warm-up operation.

Figure 3:
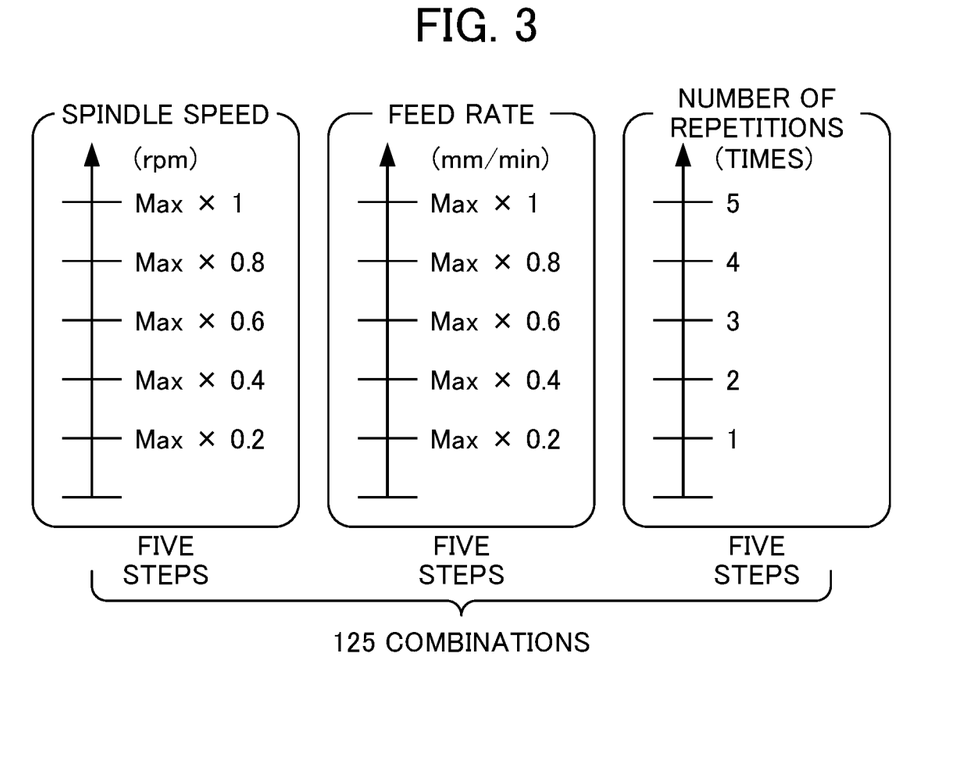
FIG. 3 is a diagram illustrating an example of setting candidates for parameter values according to the embodiment.

FIG. 3 is a diagram illustrating an example of setting candidates for parameter values according to the present embodiment. When a spindle speed, a feed rate, and the number of repetitions are prepared as parameters, the evaluation unit 15 sets each parameter in five steps up to the maximum value, for example, inputs all 125 combinations to the machine learning model 20, and obtains evaluation data for each combination. The combinations of these parameter values may be designated by a user.

In this case, the evaluation unit 15 may present a parameter value of which a specific item of any one of pieces of evaluation data has the highest evaluation value among parameter values of which the pieces of evaluation data output when a plurality of patterns of predetermined parameter values are input satisfy a predetermined condition. For example, it is known that although quick warm-up can be expected if the spindle speed or the feed rate is increased, power consumption increases. Therefore, when power consumption is used as evaluation data in addition to the time taken for a warm-up operation, it is possible to select a combination of parameter values with which quick warm-up can be realized while suppressing power consumption on the basis of the output evaluation data.

Figure 4:
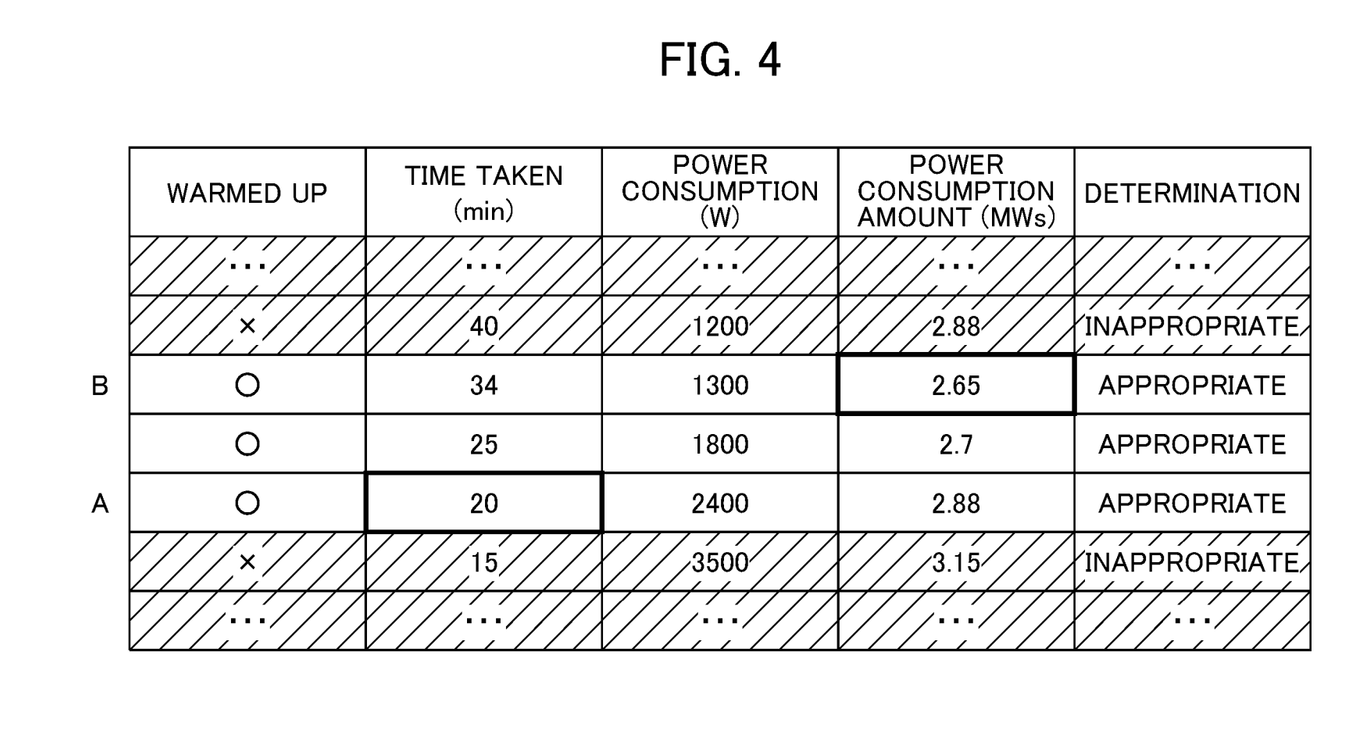
FIG. 4 is a diagram illustrating a first example of an output method by an evaluation unit according to the embodiment.

FIG. 4 is a diagram illustrating a first example of an output method by the evaluation unit 15 according to the present embodiment. In this example, among the 125 parameter values, "warmed up sufficiently" "time taken (min)", "power consumption (W)" which are evaluation data for some parameter values determined to be appropriate as a warm-up operation are illustrated.

Being appropriate as a warm-up operation is determined by a condition such as, for example, being warmed up sufficiently, the time taken being short (for example, 35 minutes or smaller), and the power consumption amount being small (for example, 3 MWs or smaller). The power consumption amount is calculated as "(Power consumption amount (Ws))=(Power consumption (J/sec=W))×(Time taken (min.))×(60 (sec))".

The evaluation unit 15 selects an optimal pattern depending on a condition based on evaluation data among appropriate warm-up operation patterns. For example, pattern A in which warm-up can be realized in the shortest time or pattern B in which the power consumption amount is the smallest may be selected depending on a situation.

Moreover, the evaluation unit 15 may present a parameter value of which a comprehensive evaluation weighted for each item of the evaluation data is the highest among parameter values of which the pieces of evaluation data output when a plurality of patterns of predetermined parameter values are input satisfy a predetermined condition.

Figure 5:
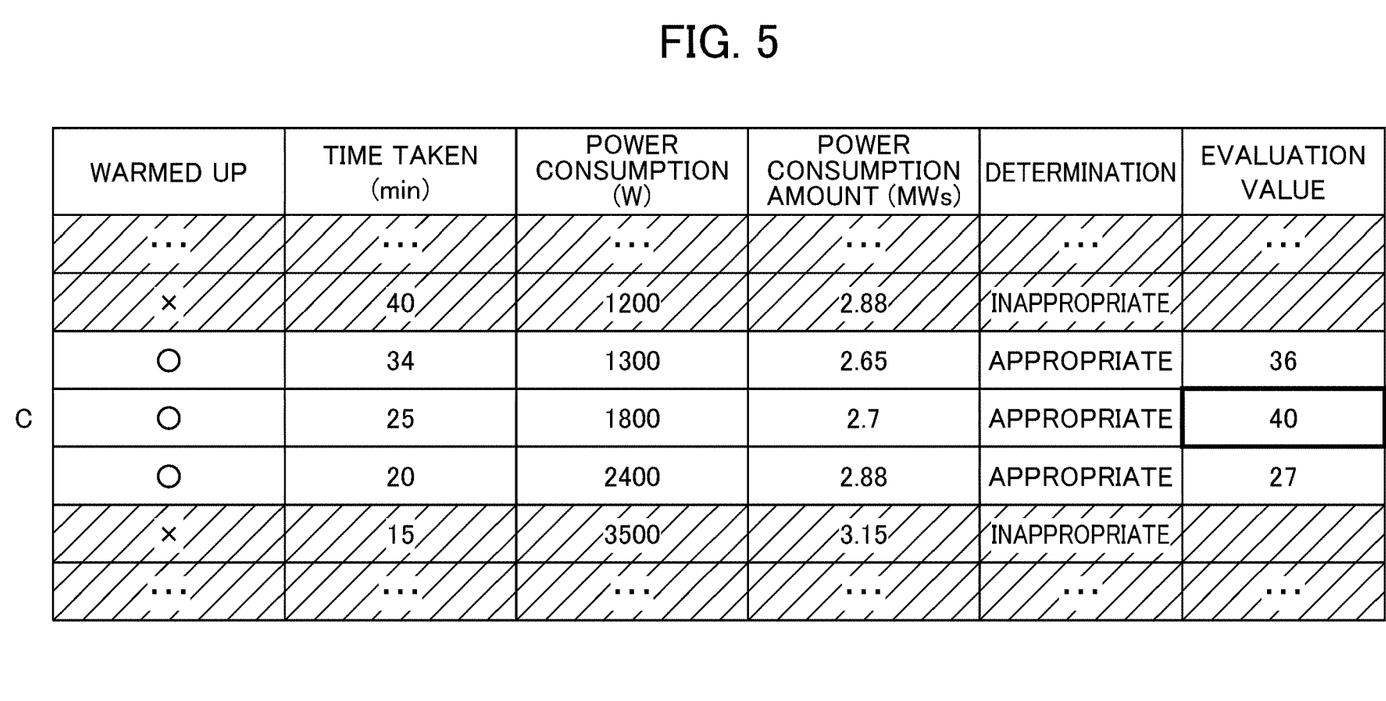
FIG. 5 is a diagram illustrating a second example of an output method by an evaluation unit according to the embodiment.

FIG. 5 is a diagram illustrating a second example of an output method by the evaluation unit 15 according to the present embodiment. In this example, the following weighted evaluation value is calculated for the evaluation data illustrated as the first example in FIG. 4

$$(\text{Evaluation value})=((35 \text{ min})-(\text{Time taken}))\times\alpha 1+((3 \text{ MWs})-(\text{Power consumption amount}))\times\alpha 2$$

Here, $\alpha 1$ and $\alpha 2$ are weighting coefficients and are set in advance as $\alpha 1=1$ and $\alpha 2=100$, for example, or are set as necessary.

The evaluation unit 15 compares evaluation values of appropriate warm-up operation patterns and selects pattern C having the largest evaluation value. A calculation formula of the evaluation value is not limited thereto but may be set appropriately.

Next, a warm-up evaluation method according to the present embodiment in a learning phase and an operation phase will be described. The numerical controller 1 learns the machine learning model 20 in a learning phase and evaluates combinations of parameter values set in a warm-up program on the basis of the machine learning model 20 in an operation phase.

Figure 6:
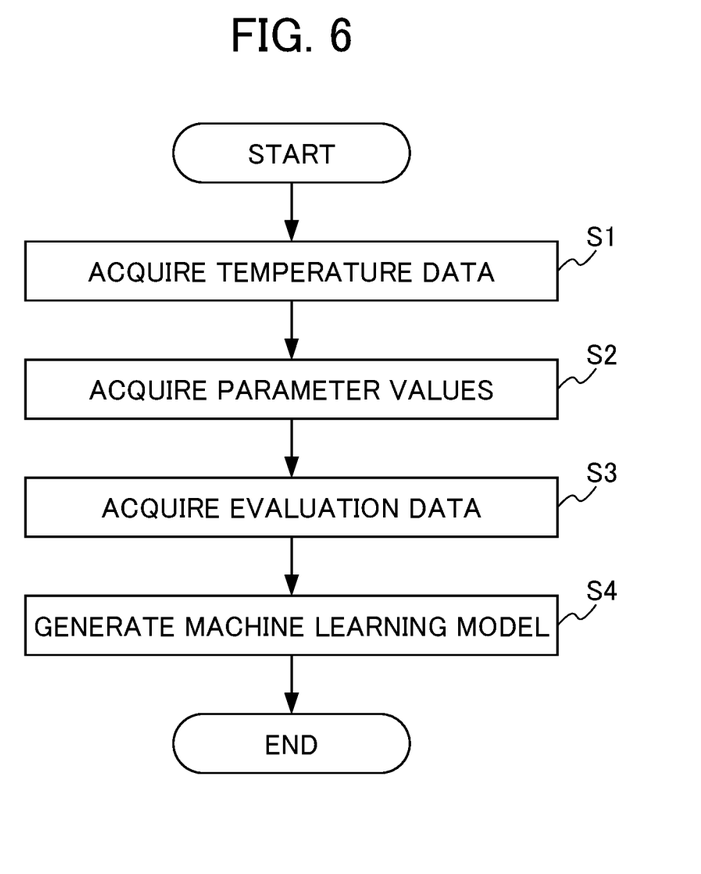
FIG. 6 is a flowchart illustrating processes in a learning phase in a warm-up evaluation method according to the embodiment.

FIG. 6 is a flowchart illustrating processes in a learning phase in a warm-up evaluation method according to the present embodiment.

In step S1, the temperature data acquisition unit 11 acquires temperature data before warm-up operation when a machine tool performs a warm-up operation. In step S2, the parameter value acquisition unit 12 acquires parameter values set in the warm-up program.

In step S3, the evaluation data acquisition unit 13 acquires evaluation data that evaluates the result of the warm-up operation when the warm-up operation ends. In step S4, the learning unit 14 generates or updates the machine learning model 20 using training data which includes temperature data and the parameter values as an input, and the evaluation data as an output.

In the learning phase, in this manner, the machine learning model 20 is constructed on the basis of a plurality of warm-up operations performed by the same or the same types of machine tools. This machine learning model 20 may be shared by a plurality of machine tools of the same type.

Figure 7:
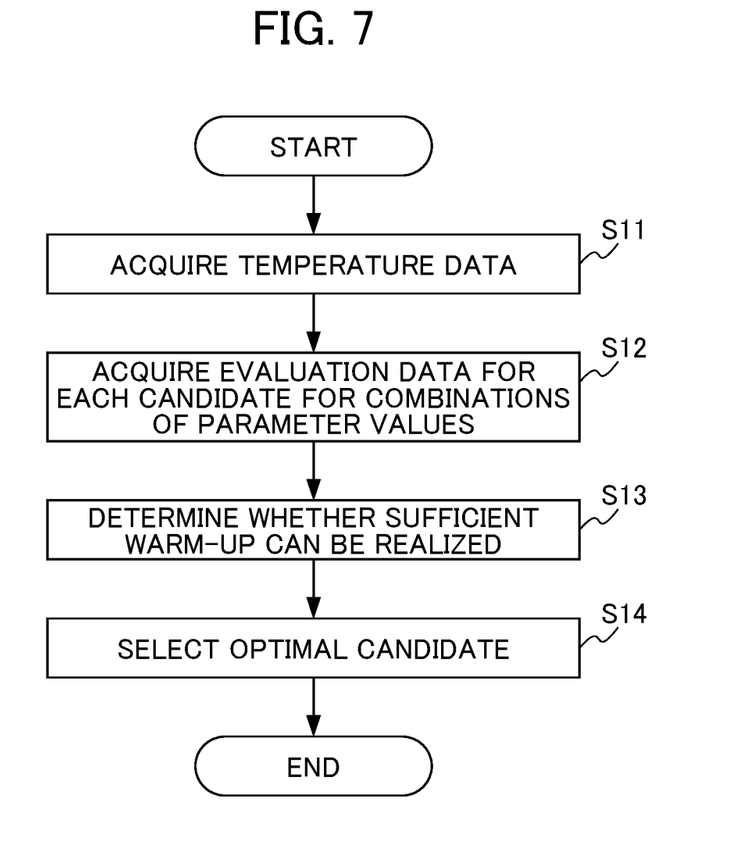
FIG. 7 is a flowchart illustrating processes in an operation phase in the warm-up evaluation method according to the embodiment.

FIG. 7 is a flowchart illustrating an operation phase in the warm-up evaluation method according to the present embodiment.

In step S11, the temperature data acquisition unit 11 acquires temperature data before warm-up operation when a machine tool performs a new warm-up operation.

In step S12, the evaluation unit 15 inputs candidates for combinations of parameter values sequentially to the constructed machine learning model 20 together with the temperature data and acquires evaluation data for each candidate.

In step S13, the evaluation unit 15 determines whether warm-up can be realized sufficiently by the warm-up program in which the respective candidates for combinations of parameter values are set on the basis of the acquired evaluation data.

In step S14, the evaluation unit 15 selects an optimal candidate in which, for example, the power consumption amount is the smallest or the predetermined evaluation value is the largest as described above among the candidates with which it was determined that an appropriate warm-up operation can be performed.

According to the present embodiment, the numerical controller 1 learns the machine learning model 20 which receives the temperature data and the parameter values of the warm-up program as an input and outputs the evaluation data for evaluating the result of the warm-up operation. The numerical controller 1 can acquire evaluation data for each candidate for combinations of parameter values and evaluate appropriateness of a warm-up operation by inputting candidates for combinations of parameter values to the machine learning model 20 when a new warm-up operation is performed. As a result, the numerical controller 1 can determine a warm-up program in which an appropriate parameter value is set.

The numerical controller 1 can determine a warm-up program with which warm-up can be realized in a short period and with small power consumption by employing the time and the power consumed for a warm-up operation as evaluation data.

The numerical controller 1 can adjust the result of a warm-up operation efficiently by making a spindle speed, a feed rate, and the number of repetitions of a program adjustable as the parameters of the warm-up program. Therefore, the numerical controller 1 can determine an appropriate warm-up program by comparing pieces of evaluation data using a plurality of combinations of these parameters having changing values as an input to the machine learning model 20.

The numerical controller 1 can generate the machine learning model 20 which is highly identifiable using the temperature data of a portion in which change in temperature with operation of a machine tool large (that is, which is greatly influenced by a warm-up operation) by acquiring the temperature of a spindle motor or the temperature of a feed axis motor as the temperature data.

The numerical controller 1 can determine a warm-up program appropriate for desired evaluation criteria such as a program in which the power consumption amount is the smallest among the warm-up programs satisfying a predetermined condition by presenting combinations of parameter values of which a specific item of any one of pieces of evaluation data has the highest evaluation value.

The numerical controller 1 can determine an appropriate warm-up program in which a plurality of evaluation criteria are balanced by presenting combinations of parameter values in which a comprehensive evaluation weighted for each item of the evaluation data is the highest.

While the embodiments of the present invention have been described, the present invention is not limited to the above-described embodiments but can be changed appropriately. Moreover, the effects described in the present embodiment are only examples of most preferable effects produced by the present invention, and the effects of the present invention are not limited to those described in the present embodiment.

In the present embodiment, although the evaluation data is measurement data in a machine tool or a determination result based on the measurement data, there is no limitation thereto. For example, an estimation value of increase in temperature obtained by computer aided engineering (CAE) analysis may be used.

In the present embodiment, although it is described that the numerical controller 1 that controls a machine tool is a warm-up evaluation device, there is no limitation thereto. The warm-up evaluation device may be a device communicably connected to one or a plurality of machines. Alternatively, the warm-up evaluation device may be an independent information processing device including a user interface for inputting temperature data, evaluation data, and the like.

The warm-up evaluation method by the numerical controller 1 is realized by software. When the method is realized by software, programs that form the software are installed in a computer. Moreover, these programs may be distributed to a user in a state of being recorded on a removable medium and may be distributed by being downloaded to a computer of a user via a network.

EXPLANATION OF REFERENCE NUMERALS

1: Numerical controller (Warm-up evaluation device)
11: Temperature data acquisition unit
12: Parameter value acquisition unit
13: Evaluation data acquisition unit
14: Learning unit
15: Evaluation unit
20: Machine learning model

What is claimed is:

1. A warm-up evaluation device comprising a processor, the processor being configured to:
   acquire temperature data of a machine prior to performing a warm-up operation;
   acquire parameter values set in a program for performing the warm-up operation;
   acquire, as a label for machine learning, actual measurement value data including temperature as a result of the warm-up operation, and time and power consumed for the warm-up operation after performing the warm-up operation;
   update a machine learning model using training data which includes the temperature data and the parameter values of a plurality of warm-up operations performed by the same or the same types of machines as an input and the acquired actual measurement value data of the plurality of warm-up operations performed by the same or the same types of machines as an output;
   input a plurality of candidates for the parameter values to the machine learning model together with the temperature data and output estimated data of expected actual measurement value data as a result of a new warm-up operation for each of the plurality of candidates when the same or the same types of machines perform the new warm-up operation;
   select one candidate from the plurality of candidates based on a result of evaluating appropriateness of the new warm-up operation according to a predetermined condition for each piece of the estimated data, wherein the predetermined condition is a combination of the time and power consumed for the warmup operation; and
   perform the new warm-up operation on the same or the same types of machines using the parameter values of the selected candidate.

2. The warm-up evaluation device according to claim 1, wherein
   the acquired actual measurement value data includes at least one of the time or the power consumed for the warm-up operations performed.

3. The warm-up evaluation device according to claim 1, wherein
   the parameter values include at least one of a spindle speed, a feed rate, and the number of repetitions of the program.

4. The warm-up evaluation device according to claim 1, wherein
   the temperature data includes at least one of a temperature of a spindle motor or a temperature of a feed axis motor.

5. The warm-up evaluation device according to claim 1, wherein
   the processor presents a parameter value of which a specific item of the actual measurement value data has the highest evaluation value among parameter values of which the actual measurement value data output when a plurality of patterns of predetermined parameter values are input satisfy a predetermined condition.

6. The warm-up evaluation device according to claim 1, wherein
   the processor presents a parameter value of which a comprehensive evaluation weighted for the actual measurement value data is the highest among parameter values of which the actual measurement value data output when a plurality of patterns of predetermined parameter values are input satisfy a predetermined condition.

7. A warm-up evaluation method for causing a computer to execute:
   a temperature data acquisition step of acquiring temperature data of a machine prior to performing a warm-up operation;
   a parameter value acquisition step of acquiring parameter values set in a program for performing the warm-up operation;
   an actual measurement data acquisition step of acquiring, as a label for machine learning, actual measurement value data including temperature as a result of the warm-up operation, and time and power consumed for the warm-up operation after performing the warm-up operation;
   an updating step of learning a machine learning model of updating a machine learning model using training data which includes the temperature data and the parameter values of a plurality of warm-up operations performed by the same or the same types of machines as an input and the acquired actual measurement value data of the plurality of warm-up operations performed by the same or the same types of machines as an output;
   an evaluation step of inputting a plurality of candidates for the parameter values to the machine learning model together with the temperature data and outputting estimated data of expected actual measurement value data as a result of a new warm-up operation for each of the plurality of candidates when the same or the same types of machines perform the new warm-up operation;
   a selecting step of selecting one candidate from the plurality of candidates based on a result of evaluating appropriateness of the new warm-up operation according to a predetermined condition for each piece of the estimated data, wherein the predetermined condition is a combination of the time and power consumed for the warmup operation; and a performing step of performing the new warm-up operation on the same or the same types of machines using the parameter values of the selected candidate.

8. A non-transitory computer-readable medium having a warm-up evaluation program recorded thereon, for causing a computer to function as the warm-up evaluation device according to claim 1.

\* \* \* \* \*